INVENTOR.
Sergio Verzolla
BY

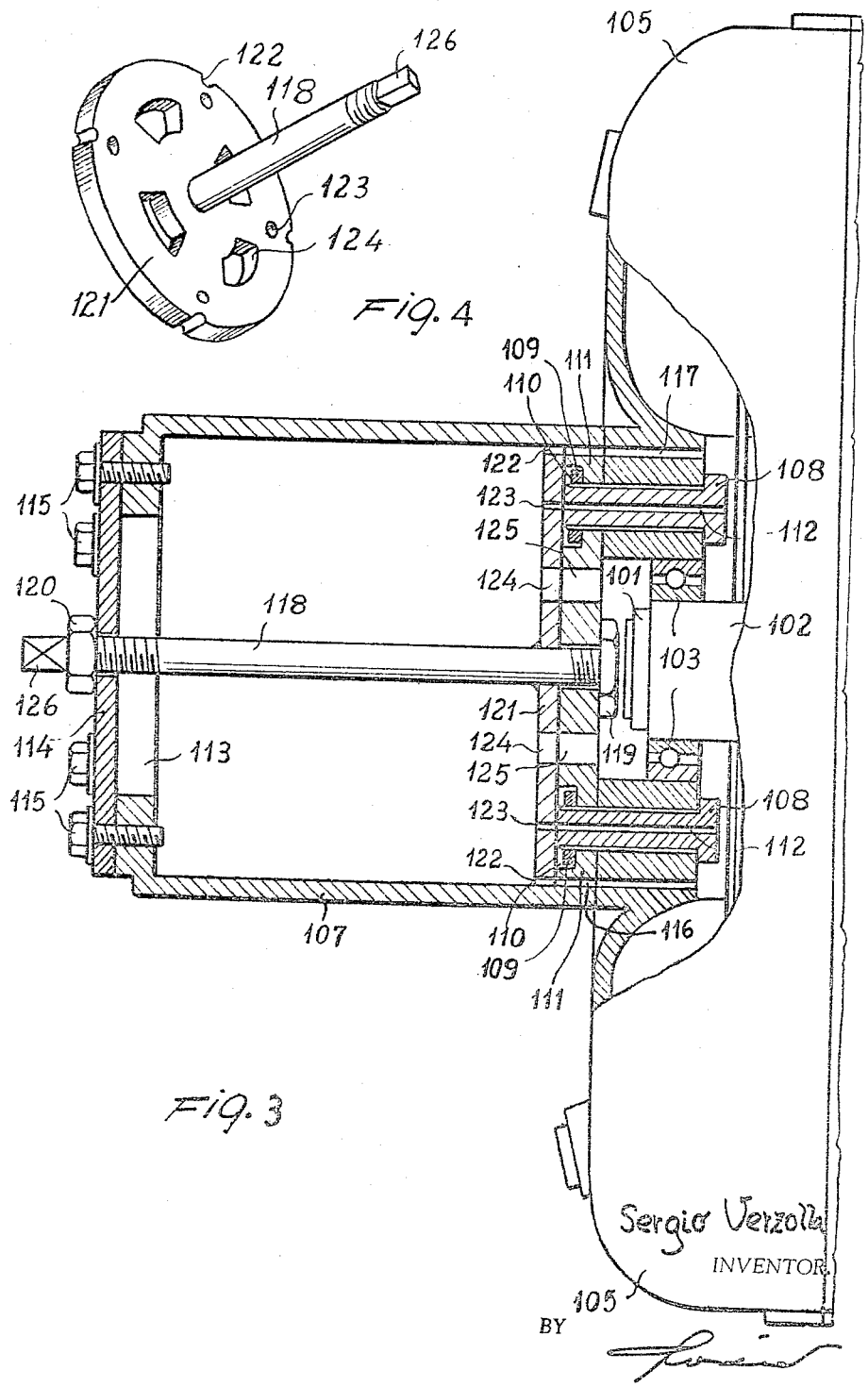

though the holes 10 in the box 6.

United States Patent Office
3,306,041
Patented Feb. 28, 1967

3,306,041
HYDRAULIC COUPLING WITH AUTOMATIC PROGRESSIVE AND ADJUSTABLE HYDRAULIC ENGAGEMENT OF THE IMPELLER AND TURBINE MEMBERS, PARTICULARLY FOR TEXTILE MACHINERY AND THE LIKE
Sergio Verzolla, Via Marasini 29, Milan, Italy
Filed June 18, 1965, Ser. No. 465,000
3 Claims. (Cl. 60—54)

This invention relates to a hydraulic coupling in which the hydraulic engagement between the impeller and turbine members is progressive in an automatic manner and is also adjustable.

In the known hydraulic couplings of this type, which are largely used in various mechanical engineering fields there is the difficulty of obtaining an adequate engagement between the impeller and turbine members depending mainly on the quantity of fluid invariably employed for each of the used couplings. When use of such couplings is made where the force applied to the driven member is continually variable, due to the above-outlined reason undesirable slipping occurs, which is at times quite detrimental to the driving and driven members.

Several attempts have been made up to now to make these couplings of more practical use, such as for example that of associating supplementary centrifugal clutch means with the turbine member, in which the friction surfaces are brought to cooperate more or less intensely with the driving member as their peripheral speed changes, and that of increasing by a compromise the quantity of fluid in the coupling. Also these arrangements have been scarcely helpful in connection with certain applications, such as for example when applied to textile machinery, since the insertion of centrifugal action masses is obviously always a function of the engagement between the driving and driven members of the hydraulic coupling whereas the increase in the fluid quantity on the one hand causes the slipping between the friction members to decrease and on the other hand it causes a less gradual and soft starting of the driven member to occur.

It is the main object of the present invention to provide a hydraulic coupling in which the engagement and disengagement of the coupling members occur by automatic graduation of the operative quantity of the transmission fluid.

It is another object of this invention to provide a coupling of the aforementioned type, in which the engagement and the disengagement of the coupling members takes place through a soft and gradual movement.

It is still another object of this invention to provide such a hydraulic coupling, in which the relative slipping of the coupling members is almost null when an established number of revolutions per minute is reached.

These and still other objects are attained by the hydraulic coupling according to the present invention, which comprises at least an impeller member, having an axis of rotation and which may be connected to a driving shaft, at least a turbine member which may be connected to the driven shaft and defining a space therebetween, a friction fluid in said space characterized in that it comprises further, at least one rotating hollow body containing a portion of said friction fluid and having calibrated communication means connecting the interior of said hollow body with said space, said hollow body being coaxial with said axis and having a radial extension less than the radial extension of said impeller and said turbine members to allow during rotation the centrifugal force to expel said friction fluid from said hollow body towards said space.

According to a further development, the present invention is characterized by the fact that said hollow body or container comprises a shutter member controlling the passage ports or holes of the communication means through which the interior of said hollow body communicates with the space between the rotors, said shutter member being associated with means which are accessible from the outside for the adjustment thereof.

Further features and advantages will become more apparent from the following detailed description of some preferred non-limiting embodiments of the coupling according to this invention when taken in conjunction with the accompanying drawings in which:

FIG. 3 shows a longitudinal sectional view taken through the container body of a further practical embodiment of the coupling; and FIG. 4 shows a perspective view of an embodiment of the shutter member associated with the coupling in FIG. 3.

Figure 1:
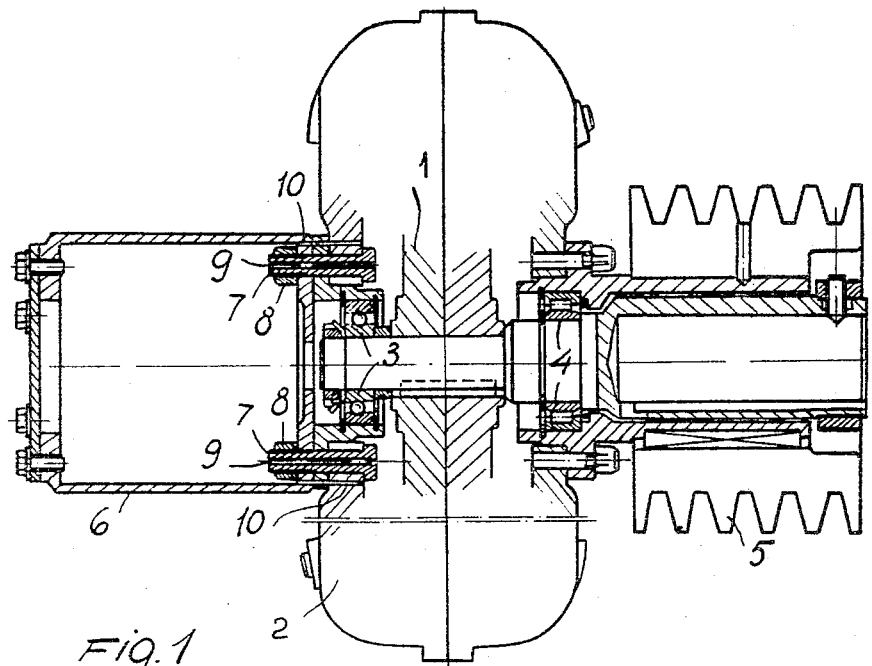
FIG. 1 shows a hydraulic coupling in a partial diametral section view according to a first embodiment of the invention.
Figure 2:
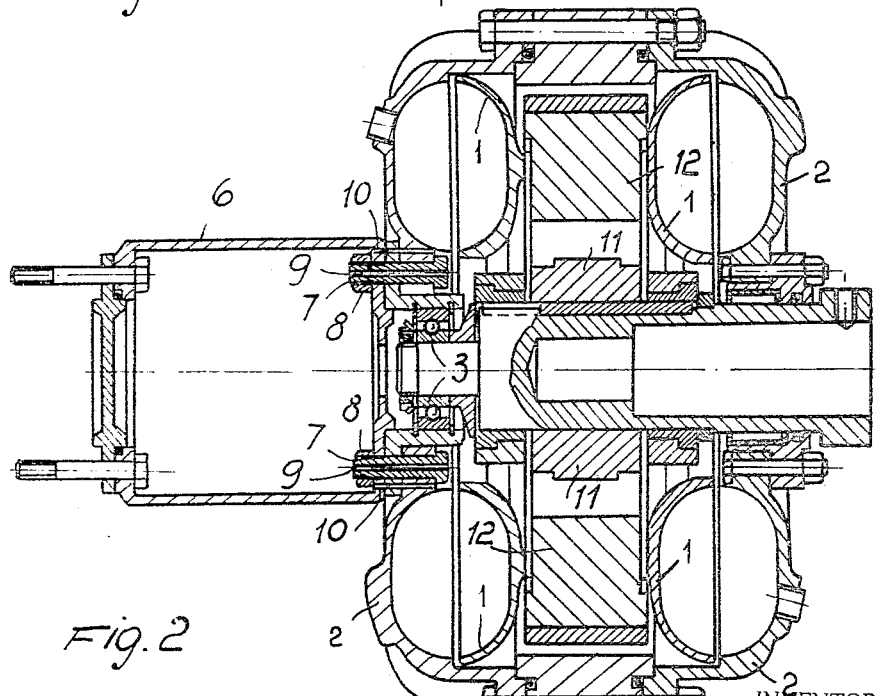
FIG. 2 shows the coupling in a diametral section view according to a second embodiment of the invention.

Referring now to FIGS. 1 and 2, in which the same elements are indicated with the same reference numbers, with 1 and 2 the impeller and the turbine members respectively of the coupling, are indicated which are coaxially and rotatably positioned to each other by means of ball or roller bearings 3 and 4 or the like provided therebetween. Said impeller and turbine members 1 and 2 are the fluid friction transmission members of the coupling and form therebetween a space or container in which the friction fluid means is contained. On the shaft of the turbine member 2 is keyed the element to which motion is to be transmitted, such as for example the pulley 5. With the same turbine member 2 is rigidly connected a substantially cylindrical box 6 by means of a plurality of bolts 7 with related nuts 8, disposed at a peripheral circumference. Said bolts 7 are axially drilled as indicated at 9 so as to put the entire box 6 into communication with the space or container surrounded by the members 1 and 2.

At a circumference external to the bolts 7 the inside of the box 6 and the aforementioned space or container defined by members 1 and 2 are further in communication through a plurality of holes 10 the central axes of which are parallel to the central axes of the drillings 9 of the aforementioned bolts 7.

The outer wall of the box 6 preferably has a frustoconical development with the generatrices diverging in the direction towards the end connected to the member 2, in which the two sets of holes or openings 9 and 10 are provided.

The operation of the coupling according to the present invention will become apparent from the foregoing.

By increasing or decreasing the peripheral speed of the impeller and turbine members 1 and 2 the fluid is caused gradually to pass through the openings 9 and 10 from the inside of the box 6 to the container formed by said members 1 and 2 and vice versa respectively thus securing a soft and gradual clutching and declutching of the aforementioned impeller and turbine members. Supposing for example that the turbine member 2 is initially motionless, the fluid will be contained besides in the container formed by the members 1 and 2 also in the box 6 (the coupling may be disposed with its axis of rotation horizontally positioned and also vertically positioned provided that the box 6 is placed in the lower position); as the member 2 is caused to rotate by flow of liquid from the impeller member 1, the rotational speed of the box 6 increases thus causing the passage of the fluid therefrom via the holes 9 and 10 into the container formed by said members 1 and 2, being pushed thereto by the centrifugal force. There occurs then a decreased slipping between the driving and driven members 1 and 2, owing to the increased quantity of friction fluid contacting the active parts of members 1 and 2.

A modification of the embodiment illustrated in FIG. 2 provides the impeller and the turbine members 1 and 2, respectively, in the form of double acting members, axially spaced from one another so as to create a space for the housing of a friction device 11 the centrifugal action masses 12 of which are spaced to cooperate by friction in connecting the driving shaft to the driven shaft when a pre-determined rotating speed limit is exceeded.

The operation of this coupling is similar to that described above in connection with FIG. 1.

Referring now to FIG. 3, a further practical embodiment of the invention is shown, in which means are also provided for adjusting the speed of the return flow of the oil from the collection space to the impeller space. In FIG. 3 the end 101 of the shaft 102, mounted on the ball bearing 103, may be seen. This shaft 102 is associated in a well-known manner with the rotating member of the coupling constituting for example the impeller member, the turbine member being represented by the outer envelope 105 of the coupling which is internally provided with the blading. With the outer envelope 105 there is associated the box 107 through the locking bolts 108 and related nuts 109 which are housed in the recesses 110 provided in the wall 111 of the box 107. Such locking bolts are provided with a through-hole 112. Said box 107 is further provided with an inspection opening 113 on a wall opposite the wall of the box connected to the coupling and with a cover 114, fastened by means of bolts 115 for the closing of such opening.

On the wall 111 near the lateral contour of the box a plurality of through-holes or channels 116 are provided which are in direct communication with as many holes 117 formed on the casing 105 of the coupling. Both the holes 112 of the locking bolts 108 and the holes 116–117 lead into the internal cavity of the coupling, which has been defined as the cavity of the rotors.

Between the wall 111 and the cover 114 the shutter member controlling the passage cross-section of the holes 112 and 116 is mounted. Such shutter member consists, as it may be seen in detail also from FIG. 4, of a pin 118 at the threaded ends of which the nuts 119 and 120 are associated, which permit their mounting inside the box 107, a disc 121 keyed and fastened on the pin 118, provided with a plurality of channels 122 disposed on the periphery of said disc and with a plurality of holes 123, the former being arranged coaxial with the holes 116–117 and the latter coaxial with the holes 112 of the locking bolts 108, in the mounted position of the disc 121.

Finally, said disc 121 is provided with openings 124 placed nearer to its axis or to the pin 118 than the other apertures 122 and 123 and coaxial with corresponding openings 125 formed in the wall 111 of the box 107. By acting on the end 126 of the pin 118 with a key or other suitable tool one may cause the disc 121 to rotate to the desired angle with respect to the wall 111. This ensures a displacement of the axes of the holes 123 and openings 122 relative to those of the holes 112 and 116–117 with the result that the passage section through such holes may be varied at will.

In operation, the oil or other fluid means which in the rest condition of the coupling has flowed by gravity into the lower portion of the cavity of the rotors and the lower portion of the cavity of the box 107 through the openings 124 and 125, when the coupling is set in rotation, through the action of the centrifugal force, returns back to the cavity of the rotors through the peripheral holes 112, 116, 117 and 123, the passage apertures of which may be adjusted at will thanks to the disc 121.

The return time of the oil into the cavity of the rotors depends consequently upon the shutter action on the return passages, so that the starting of the transmission movement of the coupling, which is dependent upon the quantity of oil being in the cavity of the rotors, may be made still more gradually.

The peripheral walls of the box 107 will be advantageously made in practice with a slightly conical development, not shown in FIG. 3, so that the centrifugal force pushing the oil against such walls admits a pushing component parallel to the walls themselves thus facilitating the oil feeding through the aforementioned peripheral holes.

Finally, a constructive characteristic, as it is shown in FIGS. 1, 2 and 3, consists in that the holes for the oil return into the cavity of the rotors, are placed relative to the blading of the rotors themselves near the point where the latter terminate toward the rotating axis of the coupling.

With this disposition of the return holes, the oil pressure prevailing within the bladings of the rotors does not impede the gradual oil return from the outer box to the cavity of the rotors, since such pressure occurs with higher peaks in the most peripheral positions of the coupling.

The present invention as described in the foregoing specification is subject to several changes and modifications, all falling however within the scope of the inventive concept. So for example the number of the oil return holes provided on the shutter member in FIG. 4 and corresponding to those in the wall 111, may vary at will depending upon working requirements of the joint.

Various material and dimensions could be practically adopted according to specific requirements involved.

What I claim is:

1. A hydraulic coupling comprising at least an impeller member having an axis of rotation and connected to a driving shaft, at least a turbine member connected to a driven shaft and defining a space therebetween, a hydraulic fluid in said space; fixed on the outside of said turbine member: a hollow body defining a chamber containing a portion of said hydraulic fluid and having calibrated communication means connecting the said chamber of said hollow body with said space, said chamber being coaxial with said axis and having a radial extension less than the radial extension of said impeller and said turbine members, said hollow body having a peripheral wall with an inner surface defining said chamber of the hollow body, said surface having a conical extension diverging towards said turbine member to allow during rotation the centrifugal force to expel said hydraulic fluid from said chamber towards said space, said calibrated communication means including at least one hole in said turbine member flush with said surface.

2. A hydraulic coupling comprising at least an impeller member having an axis of rotation and which may be connected to a driving shaft, at least a turbine member which may be connected to a driven shaft and defining a space therebetween, a hydraulic fluid in said space, at least a rotating hollow body containing a portion of said hydraulic fluid and having calibrated communication means connecting the interior of said hollow body with said space, said hollow body being coaxial with said axis and having a radial extension less than the radial extension of said impeller and said turbine members to allow during rotation the centrifugal force to expel said hydraulic fluid from said hollow body towards said space, a shutter member controlling the passage communicating with said space, said shutter member including a pin, a disc keyed and fixed on said pin, means allowing rotation of said shutter member within said hollow body, said disc being provided with a plurality of holes and openings adapted to be aligned with corresponding holes provided in the wall of said hollow body and communicating with said space.

3. A hydraulic coupling comprising at least an impeller member having an axis of rotation and which may be connected to a driving shaft, at least a turbine member which may be connected to a driven shaft and defining a space therebetween, a hydraulic fluid in said space, at least a rotating hollow body containing a portion of said hydraulic fluid and having calibrated communication means connecting the interior of said hollow body with said space, said hollow body being coaxial with said axis and having a radial extension less than the radial extension of said impeller and said turbine members to allow during rotation the centrifugal force to expel said hydraulic fluid from said hollow body towards said space, a shutter member controlling the passage communicating with said space, said shutter member including a pin, a disc keyed and fixed on said pin, means allowing rotation of said shutter member within said hollow body, said disc being provided with a plurality of holes and openings adapted to be aligned with corresponding holes provided in the wall of said hollow body and communicating with said space, said pin having an actuable head projecting at the outside from said hollow body.

References Cited by the Examiner

UNITED STATES PATENTS

| | | | |
|---|---|---|---|
| 2,380,734 | 7/1945 | Eastin | 60—54 X |
| 2,875,581 | 3/1959 | Kugel | 60—54 |
| 3,107,492 | 10/1963 | Croft et al. | 60—54 |
| 3,156,335 | 11/1964 | Nelden | 60—54 X |
| 3,173,260 | 3/1965 | Kugel | 60—54 |

EDGAR W. GEOGHEGAN, *Primary Examiner.*